United States Patent
Ginn et al.

(10) Patent No.: US 9,854,071 B2
(45) Date of Patent: Dec. 26, 2017

(54) REDUNDANT, LOW-LATENCY DIGITAL AUDIO TRANSMISSION

(71) Applicant: AMG IP, LLC, Durango, CO (US)

(72) Inventors: Justin Ginn, Durango, CO (US); Ryan Danford, Durango, CO (US); Chip Lile, Durango, CO (US); Cordwell Brown, Durango, CO (US); Andrew Paul Lentvorski, San Diego, CA (US); Raymond David Sanderlin, Durango, CO (US)

(73) Assignee: AMG IP, LLC, Durango, CO (US)

( * ) Notice: Subject to any disclaimer, the term of this patent is extended or adjusted under 35 U.S.C. 154(b) by 215 days.

(21) Appl. No.: 13/947,401

(22) Filed: Jul. 22, 2013

(65) Prior Publication Data

US 2014/0023091 A1 Jan. 23, 2014

Related U.S. Application Data

(60) Provisional application No. 61/674,697, filed on Jul. 23, 2012.

(51) Int. Cl.
*H04L 29/06* (2006.01)
*H04L 29/08* (2006.01)

(52) U.S. Cl.
CPC ............ *H04L 69/164* (2013.01); *H04L 67/18* (2013.01); *H04L 69/08* (2013.01)

(58) Field of Classification Search
CPC ........ H04L 69/164; H04L 67/18; H04L 69/08
See application file for complete search history.

(56) References Cited

U.S. PATENT DOCUMENTS

| 6,226,301 B1 * | 5/2001 | Cheng et al. .................. 370/320 |
| 6,574,668 B1 * | 6/2003 | Gubbi .................. H04L 1/1614 709/231 |
| 6,711,380 B1 * | 3/2004 | Callaway, Jr. ....... H04B 1/1027 219/702 |

(Continued)

OTHER PUBLICATIONS

Huang, Chung-Ming, et al., "REDUP: a packet loss recovery scheme for real-time audio streaming over wireless IP networks", Laboratory of Multimedia Mobile Networking, Department of Computer Science and Information Engineering, National Cheng Kung University, No. 1. University Road, Tainan 70101, Taiwan, ROC Received Dec. 24, 2003; received in revised form Nov. 25, 2004;, (2006), 29-42.

*Primary Examiner* — Chirag Shah
*Assistant Examiner* — Joshua Smith
(74) *Attorney, Agent, or Firm* — Christensen, Fonder, Dardi & Herbert PLLC

(57) ABSTRACT

Methods and systems for converting an audio signal into a stream of digital audio packets are presented. An example converter device may include a receiver, a digital audio encoder, a digital audio packetizer, and a transmitter. The receiver may receive an audio signal. The digital audio encoder may encode the audio signal into a stream of digital audio values. The digital audio packetizer may generate a stream of digital audio data packets from the stream of digital audio values. Each of the digital audio data packets may include a current digital audio value and at least one previous digital audio value of the stream of digital audio values. The transmitter may transmit the stream of digital audio data packets to a receiving device.

22 Claims, 16 Drawing Sheets

| | BYTE NO. | VALUE |
|---|---|---|
| | 0 | VERSION NUMBER (E.G., 0x01) |
| | 1 | NUM. OF VALUES IN PACKET (E.G., 0X04) |
| CURRENT AUDIO VALUE 402 (E.G., VALUE X) | 2 THROUGH 5 | SEQUENCE NUMBER OF CURRENT AUDIO VALUE |
| | 6 | LENGTH OF CURRENT VALUE (N) |
| | 7 THROUGH N+6 | CURRENT AUDIO VALUE DATA (N BYTES) |
| | N+7 | VERIFICATION BYTE (E.G., 0xA5) |
| FIRST REPLICANT AUDIO VALUE 404 (E.G., VALUE X-7) | N+8 THROUGH N+11 | SEQUENCE NUMBER OF FIRST REPLICANT AUDIO VALUE |
| | N+12 | LENGTH OF FIRST REP. VALUE (N) |
| | N+13 THROUGH 2N+12 | FIRST REPLICANT AUDIO VALUE DATA (N BYTES) |
| | 2N+13 | VERIFICATION BYTE (E.G., 0xA5) |
| SECOND REPLICANT AUDIO VALUE 406 (E.G., VALUE X-13) | 2N+14 THROUGH 2N+17 | SEQUENCE NUMBER OF SECOND REPLICANT AUDIO VALUE |
| | 2N+18 | LENGTH OF SECOND REP. VALUE (N) |
| | 2N+19 THROUGH 3N+18 | SECOND REPLICANT AUDIO VALUE DATA (N BYTES) |
| | 3N+19 | VERIFICATION BYTE (E.G., 0xA5) |
| THIRD REPLICANT AUDIO VALUE 408 (E.G., VALUE X-17) | 3N+20 THROUGH 3N+23 | SEQUENCE NUMBER OF THIRD REPLICANT AUDIO VALUE |
| | 3N+24 | LENGTH OF THIRD REP. VALUE (N) |
| | 3N+25 THROUGH 4N+24 | THIRD REPLICANT AUDIO VALUE DATA (N BYTES) |
| | 4N+25 | VERIFICATION BYTE (E.G., 0xA5) |
| | 4N+26 THROUGH M-1 | FILL BYTES (E.G., 0x00) |

400

(56) References Cited

U.S. PATENT DOCUMENTS

| | | | |
|---|---|---|---|
| 8,213,973 B2* | 7/2012 | Lu et al. | 455/500 |
| 2002/0093924 A1* | 7/2002 | Preston et al. | 370/328 |
| 2003/0214926 A1* | 11/2003 | Choi et al. | 370/335 |
| 2005/0281243 A1* | 12/2005 | Horn et al. | 370/345 |
| 2007/0201364 A1* | 8/2007 | Nakajima et al. | 370/230 |
| 2013/0123019 A1* | 5/2013 | Sullivan et al. | 463/42 |

* cited by examiner

|   | BYTE NO. | VALUE |
|---|---|---|
|   |   | 400 |
|   | 0 | VERSION NUMBER (E.G., 0x01) |
|   | 1 | NUM. OF VALUES IN PACKET (E.G., 0X04) |
| CURRENT AUDIO VALUE 402 (E.G., VALUE X) | 2 THROUGH 5 | SEQUENCE NUMBER OF CURRENT AUDIO VALUE |
|   | 6 | LENGTH OF CURRENT VALUE (N) |
|   | 7 THROUGH N+6 | CURRENT AUDIO VALUE DATA (N BYTES) |
|   | N+7 | VERIFICATION BYTE (E.G., 0xA5) |
| FIRST REPLICANT AUDIO VALUE 404 (E.G., VALUE X-7) | N+8 THROUGH N+11 | SEQUENCE NUMBER OF FIRST REPLICANT AUDIO VALUE |
|   | N+12 | LENGTH OF FIRST REP. VALUE (N) |
|   | N+13 THROUGH 2N+12 | FIRST REPLICANT AUDIO VALUE DATA (N BYTES) |
|   | 2N+13 | VERIFICATION BYTE (E.G., 0xA5) |
| SECOND REPLICANT AUDIO VALUE 406 (E.G., VALUE X-13) | 2N+14 THROUGH 2N+17 | SEQUENCE NUMBER OF SECOND REPLICANT AUDIO VALUE |
|   | 2N+18 | LENGTH OF SECOND REP. VALUE (N) |
|   | 2N+19 THROUGH 3N+18 | SECOND REPLICANT AUDIO VALUE DATA (N BYTES) |
|   | 3N+19 | VERIFICATION BYTE (E.G., 0xA5) |
| THIRD REPLICANT AUDIO VALUE 408 (E.G., VALUE X-17) | 3N+20 THROUGH 3N+23 | SEQUENCE NUMBER OF THIRD REPLICANT AUDIO VALUE |
|   | 3N+24 | LENGTH OF THIRD REP. VALUE (N) |
|   | 3N+25 THROUGH 4N+24 | THIRD REPLICANT AUDIO VALUE DATA (N BYTES) |
|   | 4N+25 | VERIFICATION BYTE (E.G., 0xA5) |
|   | 4N+26 THROUGH M-1 | FILL BYTES (E.G., 0x00) |

FIG. 4A

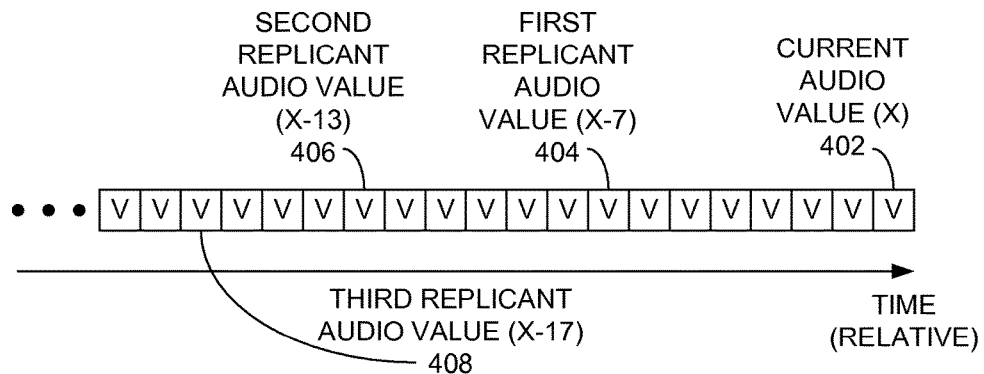
FIG. 4B
EXAMPLE SETUP FILE
500
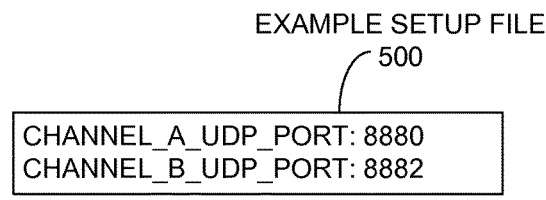
FIG. 5
EXAMPLE BEACON FILE
600
```
<?xml version="1.0" encoding="UTF-8"?>
<AUDIOAIR>
    <CODECTYPE>CELT</CODECTYPE>
    <SOFTWARE>1.00</SOFTWARE>
    <VID>2</VID>
    <VTITLE>Joe's Bar and Grill</VTITLE>
    <STREAMER>
        <CH><P>8880</P><D>TV-Mono-A1</D><D>TV-Mono-B1</D></CH>
        <CH><P>8882</P><D>TV-Mono-C1</D><D>TV-Mono-D1</D></CH>
    </STREAMER>
</AUDIOAIR>
```
FIG. 6

REDUNDANT, LOW-LATENCY DIGITAL AUDIO TRANSMISSION

RELATED APPLICATIONS

This application claims the benefit of priority of U.S. Provisional Application No. 61/674,697, titled "REDUNDANT, LOW-LATENCY DIGITAL AUDIO TRANSMISSION," filed Jul. 23, 2012, and which is hereby incorporated herein by reference in its entirety.

TECHNICAL FIELD

This application relates generally to transmission of digital audio data and, more specifically, to systems and methods for redundant, low-latency transmission of one or more digital audio streams.

BACKGROUND

In many environments, any delay or latency that results from the generation and transmission of digital audio data for presentation or playback to a listener is not problematic. For example, when an audio Compact Disc (CD) is played, several hundreds of milliseconds may elapse during the time period that the digital audio data is read from the CD, a corresponding analog signal is derived from the digital data and subsequently amplified, and acoustic sound waves are generated from the amplified audio signal. However, such a delay is generally not detectable by the listener, as the listener has no reference point in time with which to detect that delay.

In other examples, such as when audio is presented in conjunction with corresponding video, as is typical with television and Digital Video Disc (DVD) presentations, latency is more of a concern, as synchronization of the audio with its corresponding video is necessary for a viewer to properly experience the resulting audio/video presentation. In that case, the digital audio and video data generally are received by a single device, such as a television, set-top box, DVD player, and the like. Further, the video and audio data are often marked with timestamp information so that the receiving device may align the video and audio data appropriately prior to forwarding the data to an output device, such as a television, for presentation to the user. Thus, any potential relative delay in the audio or video data of an audio/video presentation is adjusted and eliminated.

However, in some environments, such an adjustment may prove to be more difficult. For example, audio associated with an audio/video presentation that is being provided by a television or similar video presentation device may be retransmitted to one or more remote audio-receiving devices to provide the audio more directly to one or more listeners. Such retransmission is likely to introduce an additional latency into the audio signal by the time the audio reaches the listeners, thus likely causing the resulting sound waves to lag the video portion of the presentation as experienced by the user by an unsatisfactory amount.

BRIEF DESCRIPTION OF THE DRAWINGS

Some embodiments are illustrated by way of example and not limitation in the figures of the accompanying drawings in which:

FIG. 4A is a graphical depiction of an example digital audio data packet transmitted by the audio converter devices of FIGS. 3A and 3B;

FIG. 4B is a timing diagram of current and replicant audio values presented in the example digital audio data packet of FIG. 4A;

FIG. 5 is a depiction of an example setup file employed by the audio converter device of FIG. 3B;

FIG. 6 is a depiction of an example beacon file employed by the audio converter device of FIG. 3B;

DETAILED DESCRIPTION

Example methods and systems for digital audio transmission are discussed. In the following description, for purposes of explanation, numerous specific details are set forth in order to provide a thorough understanding of example embodiments. It will be evident, however, to one skilled in the art that the present subject matter may be practiced without these specific details. It will also be evident that the venues and environments described herein in which digital audio transmission may occur are not limited to the examples provided and may include other scenarios not specifically discussed.

Figure 1:
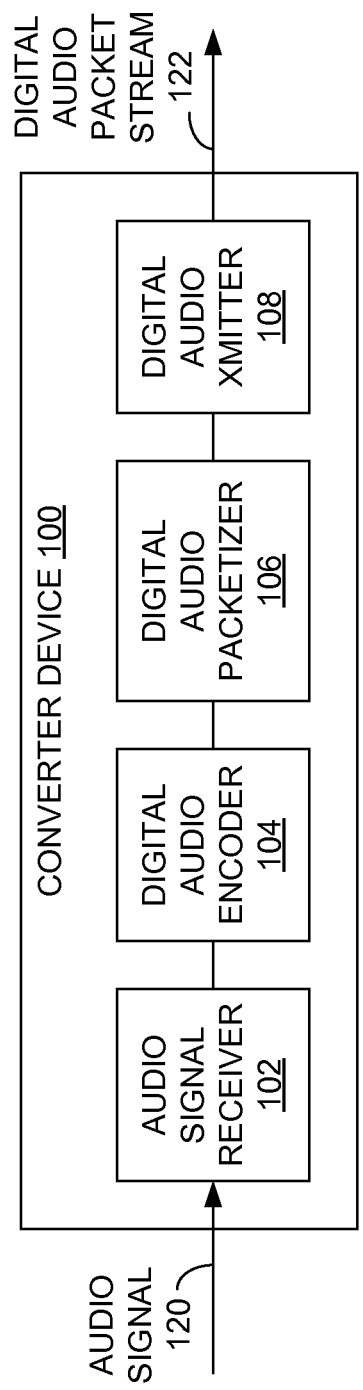
FIG. 1 is a block diagram illustrating an example of an audio converter device.

In accordance with an example embodiment, FIG. 1 illustrates a converter device 100 for receiving and converting an audio signal 120 into a digital audio packet stream 122. In the examples discussed in greater detail below, the received audio signal 120 is an analog audio signal, such as what may be provided via an analog audio output of a television, set-top box, audio receiver, or the like. In other examples, the received audio signal 120 may be a digital audio signal that the converter device 100 processes further to generate the digital audio packet stream 122. In one implementation, the digital audio packet stream 122 is provided to one or more mobile communication devices, such as smart phones and other mobile devices, either directly or via an intermediate access device, as described more completely below.

In at least some embodiments, the converter device 100 processes the incoming audio signal 120 to provide a digital audio packet stream 122 that a mobile device may receive and present to a user while inserting a minimum amount of latency and providing a level of robustness in electrically noisy and high traffic environments. Other possible benefits and advantages may be realized from the various embodiments described more fully below.

The converter device 100 of FIG. 1 may include an audio signal receiver 102, a digital audio encoder 104, and digital audio packetizer 106, and a digital audio transmitter 108. In one example, the audio signal receiver 102 receives the audio signal 120 and prepares the audio signal 120 for encoding by the digital audio encoder 104. If, for example, the audio signal 120 is an analog audio signal, the audio signal receiver 102 may convert the analog audio signal into a digital audio signal. Alternatively, if the audio signal 120 is a digital audio signal, the audio signal receiver 102 may process the digital audio signal to provide a different digital audio signal more susceptible to processing by the digital audio encoder 104. Such additional processing may not be required for some received digital audio signals, however.

The digital audio encoder 104 may take a digital audio signal as input and encode the digital audio signal into a stream of digital audio data values for transmission to a receiving device more efficiently. This encoding may thus allow multiple digital audio packet streams 122, as well as other information, to be transmitted concurrently by multiple converter devices 100 in the same vicinity. In one example, the encoding method employed by the digital audio encoder 104 may be a low-latency encoding method such that a relatively small amount of input digital data is required to produce corresponding output digital data.

The encoded digital audio data values produced by the digital audio encoder 104 are supplied to the digital audio packetizer 106, which may package the encoded values into separately transmittable data packets. In one example, each data packet may contain at least one current encoded audio value, as well as one or more previous encoded audio values, thus providing duplicate digital audio values to help prevent missing digital audio values at the receiving device due to message collisions, electrical interference, heavy communication traffic, and so on.

The digital audio packetizer 106 may then forward the generated audio data packets to a digital audio transmitter 108 for transmission as a digital audio packet stream 122. The digital audio transmitter 108 may transmit the digital audio packet stream 122 over a wired or wireless connection to the receiving devices, either directly or via an intermediate access device, as is indicated below.

Figure 2:
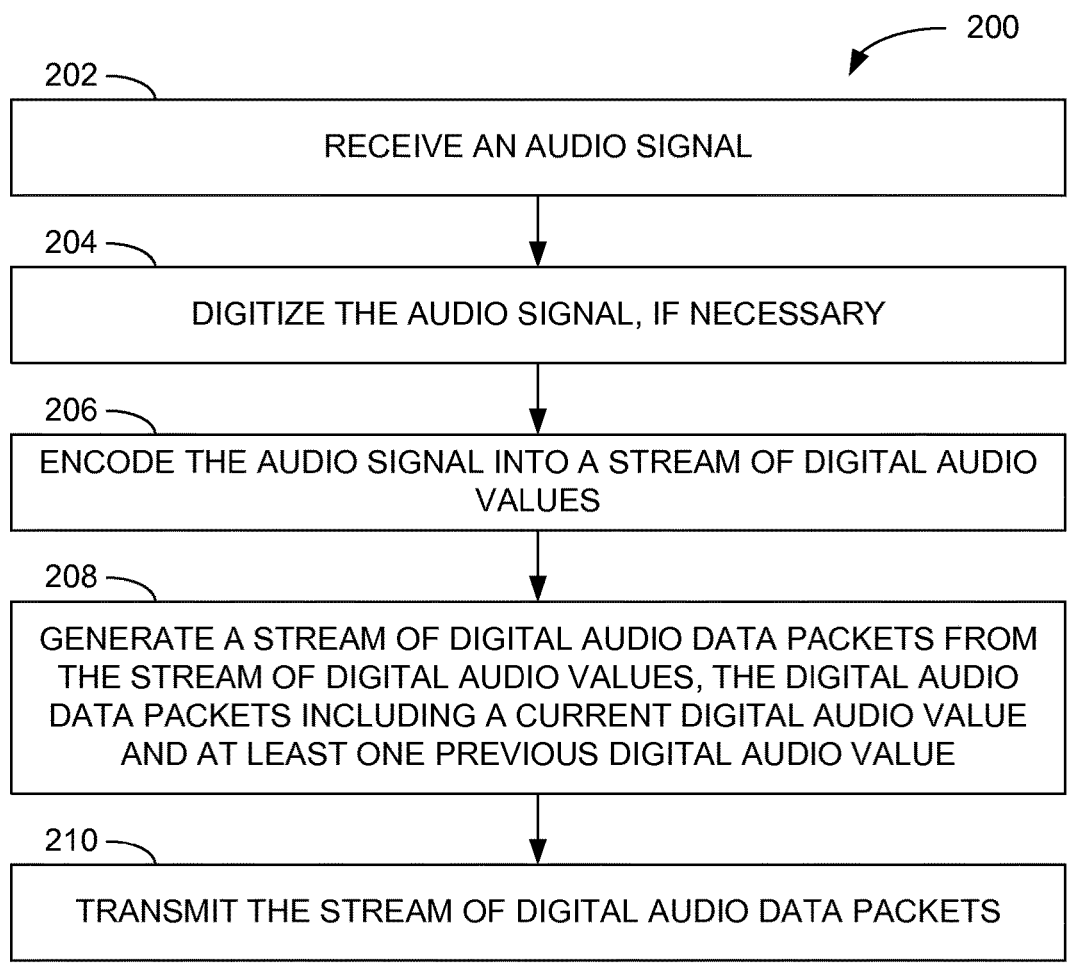
FIG. 2 is a flow diagram illustrating an example method of operating the example audio converter device of FIG. 1.

FIG. 2 is a flow diagram illustrating an example method 200 of operating an audio converter device, such as the example audio converter device 100 of FIG. 1. In the method 200, an audio signal, such as an analog or digital audio signal, is received (operation 202). In addition, in the case of an analog audio signal being received, the analog audio signal may be converted to a digital audio signal (operation 204). The audio signal may then be encoded into a stream of digital audio values (operation 206). In one example, the encoding is performed according to a low-latency encoding process. A stream of digital audio data packets may then be generated from the stream of digital audio data values, with each of the digital audio data packets including a current (or more recent) digital audio value and at least one previous (or older) digital audio value (operation 208). The stream of digital audio data packets is then transmitted (operation 210).

Figure 3A:
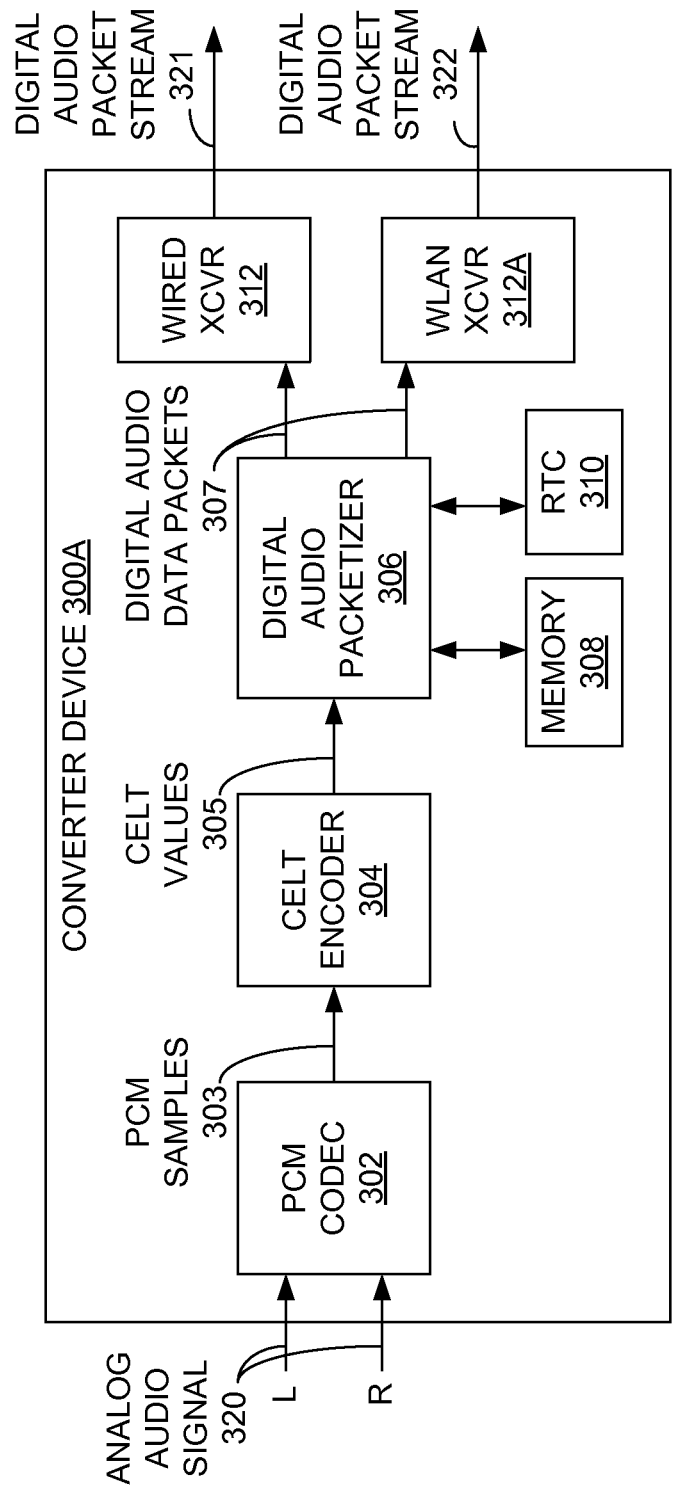
FIGS. 3A and 3B are block diagrams illustrating other examples of audio converter devices.

FIG. 3A is a block diagram illustrating another example of an audio converter device 300A, which may include a Pulse Code Modulation (PCM) encoder or codec (coder-decoder) 303, a Constrained Energy Lapped Transform (CELT) encoder 304, a digital audio packetizer 306, a wired transceiver 312 and/or a wireless local-area network (LAN) transceiver 312A, possibly along with memory 308 and a real-time clock (RTC) 310. Other possible components of the converter 300A not explicitly shown in FIG. 3A may also be included in other implementations.

The converter device 300A may receive a stereo analog audio signal 320 including separate left (L) and right (R) signals. In another implementation, each of the left and right signals may be unrelated monaural audio signals. The analog audio signal 320 is provided to the PCM codec 302 operating as an analog-to-digital converter (ADC) to produce PCM samples 303. In one example, the PCM codec 302 may operate at 48 kbps (kilobits per second) to generate the PCM samples 303 that may include a combined stream of digital data samples for the left and right audio channels. Each sample may be a signed 16-bit value for each of the left and right channels in one example, while in other implementations any sample size may be employed that is compatible with the desired audio quality of the resulting digital audio being provided by the converter device 300A. Depending on the implementation, the PCM codec 302 may be an application-specific integrated circuit (ASIC) designed specifically for PCM encoding, or may be a general-purpose microcontroller, microprocessor, or digital signal processor (DSP) programmed to perform the PCM encoding function. One example of an ASIC for performing the encoding operation of the PCM codec 302 may be the TLV320AIC3204 Stereo Audio Codec by Texas Instruments, Inc. In one implementation, the PCM codec 302 may provide an automatic gain control (AGC) function to adjust for a range of signal levels in the stereo analog audio signal 320.

The generated PCM samples 303 may then be provided as input to the CELT encoder 304 for generating CELT values 305. Generally, the CELT encoding process is capable of operating under a minimum fundamental time frame, and thus latency, of 10 msec (milliseconds), thus providing a low latency encoding process compared to other encoding algorithms, such as MPEG-2 (Motion Picture Experts Group-2) Audio Layer III (MP3), which may introduce a latency of as much as 200 msec. Thus, the loss of any single CELT value 305 will impact the quality of the resulting digital audio output in a negligible manner. Longer minimum fundamental time frames, such as 20 msec, may also be used in the CELT encoder 305 in other embodiments. In one implementation, the CELT values 305 may constitute a single stream of digital audio data values representing both channels of the analog audio signal 320 received at the converter device 300A. Depending on the embodiment, the CELT encoder 304 may be an ASIC designed specifically for CELT encoding, or may be a general-purpose microcontroller, microprocessor, or DSP programmed to perform the CELT encoding function. One example of a microcontroller may be the 32-bit Programmable Interface Controller (PIC32) microcontroller by Microchip Technology, Inc. Also, while the CELT may be chosen as the encoding process in the example of FIGS. 3A and 3B, other low-latency encoding formats may be utilized in other embodiments.

The digital audio packetizer 306 may then generate a plurality of digital audio data packets 307 based on the CELT values 305. As with the PCM codec 302, the digital audio packetizer 306 may be an ASIC or a more general-purpose microprocessor, microcontroller, or DSP programmed to perform the packetizing functions discussed herein. Also, in one example, the CELT values 305 may be forwarded to the digital audio packetizer 306 by way of a direct memory access (DMA) channel of the packetizer 306.

In one embodiment, each digital audio data packet 307 includes the current or most recent CELT value 305 in addition to at least one older CELT value 305 to ensure that each of the values is transmitted more than once. More specifically, each older sample in a particular digital audio data packet 307 may include at least one CELT value 305 that precedes the current value in the packet 307 by some prime number of values (termed herein a "prime number replicant"). In at least some examples, by using prime numbers in this fashion, and by providing multiple copies of the same value at different times, the digital audio packetizer 306 provides copies of each value at varying periods of time, thus helping to prevent all copies of the same value from being interfered with by a periodic noise or communication source. FIG. 4A, discussed in detail below, provides just one example of a particular packet format in which a current CELT value 305 and three older CELT values 305 are provided.

The digital audio packetizer 306, in one implementation, may format or encapsulate each of the digital audio data packets 307 as a User Datagram Protocol (UDP) packet or some variant thereof. Generally, UDP is a low-overhead, connectionless communication protocol that does not provide an explicit mechanism for data integrity or ordering. As a result, the digital audio packetizer 306 may normally transmit multiple copies of each digital audio data packet 307 and label each packet 307 with a sequence number to allow a receiving device to assemble the received packets 307 in the intended order, if necessary.

As shown in FIG. 3A, the digital audio data packets 307 may be transferred over a wired connection via the wired transceiver 312 as a digital audio packet stream 321. In one example, the wired transceiver 312 may be an Ethernet transceiver that transmits the digital audio packet stream 321 via an RJ-45 connector. In another example, the digital audio data packets 307 may be transferred over a wireless connection via the wireless LAN transceiver 312A as a digital audio packet stream 322. In one example, the wireless LAN transceiver 312A may be a WiFi® (IEEE 802.11b/g/n) transceiver. In some implementations, either or both of the wired transceiver 312 and the wireless LAN transceiver 312A may be incorporated into the converter device 300A. In yet other embodiments, other types of communication interfaces may be employed for the transmission of the digital audio data packets 307.

These same transceivers 312, 312A may be used to load, access, and update configuration and other operational data of the converter device 300A. In addition, as is described below in conjunction with FIGS. 5 and 6, the memory 308, if included in the converter device 300A, may hold configuration and other operational data which is employed by the converter device 300A. In one example, the memory 308 may be a captive flash memory device, a removable micro-SD (Secure Digital) card, or some other non-volatile memory device.

The RTC 310, if incorporated in the converter device 300B, may facilitate logging of data, events, and other information of potential interest occurring within, or generated by, the converter device 300A to a provider or user of the converter device 300A.

Figure 3B:
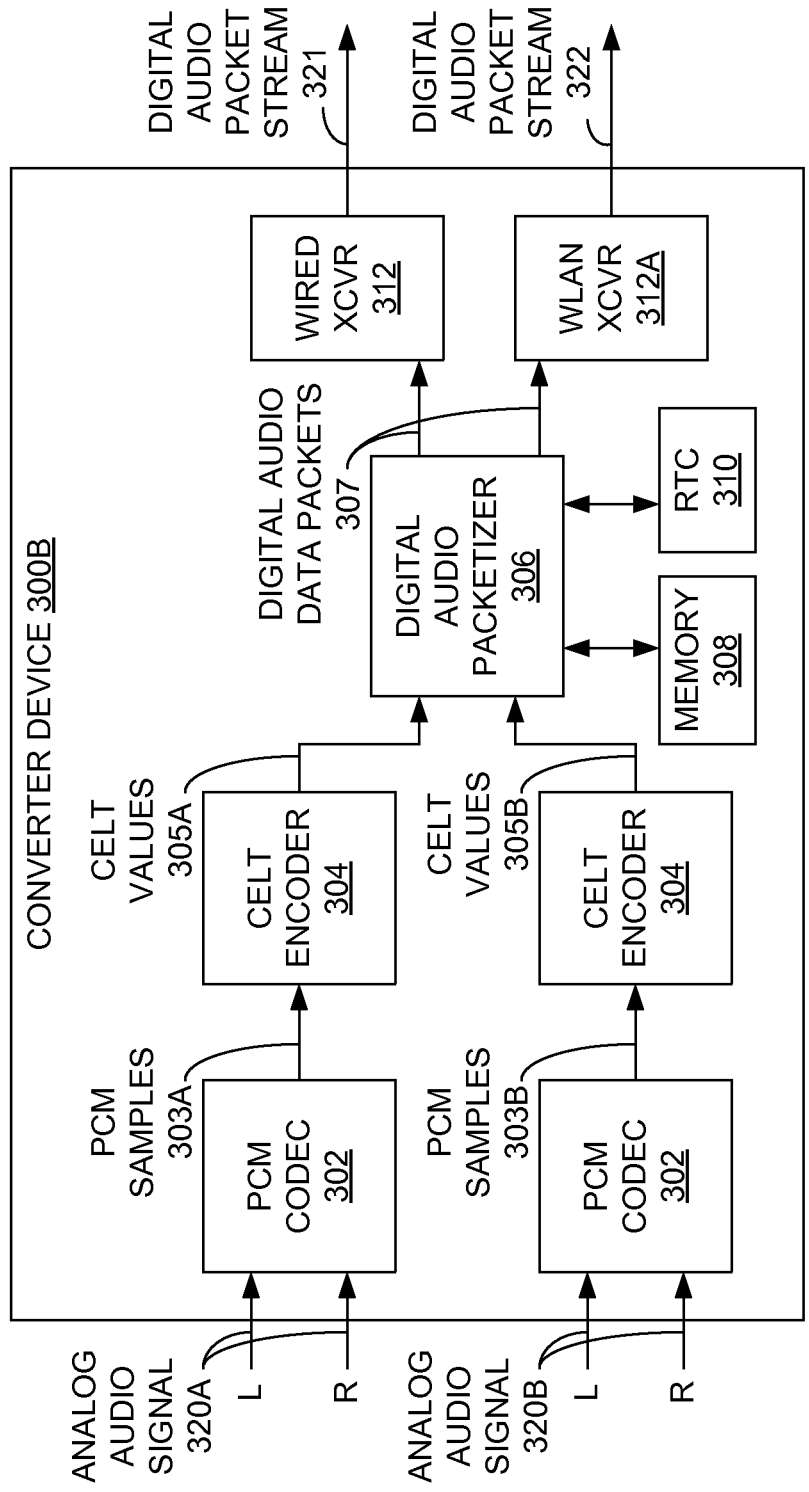

FIG. 3B provides a block diagram of another example converter device 300B, in which two separate analog audio signals 320A, 320B (or four separate monaural audio signals) may be processed by two PCM codecs 302 (providing corresponding sets of PCM samples 303A, 303B) and two CELT encoders 304 (producing two separate streams of CELT values 305A, 305B). The digital audio packetizer 306 may then process the two streams of CELT values 305A, 305B concurrently to produce one or two streams of digital audio data packets 307 for subsequent transmission. In other examples, any number of PCM codecs 302 and associated CELT decoders 304 may be employed to process that number of analog audio signals 320 within the same converter device 300B.

FIG. 4A is a graphical depiction of an example digital audio data packet 400 transmitted by the audio converter device 100 of FIG. 1, or the audio converter devices 300A, 300B of FIGS. 3A and 3B, respectively. As shown, the packet 400 is m bytes in length overall, and includes a current audio value 402 and three previous (replicant) audio values 404, 406, and 408, each of length n bytes, associated with an analog audio signal 320, 320A, 320B. In the examples of FIGS. 3A and 3B, the audio values are CELT values 305. In this particular example, the packet 400 begins with a version number (in this case, 0x01 (01 in hexadecimal notation)) that indicates the specific format of the data in the remainder of the packet 400. Following the version number may be an indication of the number of audio values 402-408 provided in the packet (0x04). While four values are provided in the particular example packet 400 of FIG. 4, fewer or greater numbers of audio values may be transported within a single packet 400 in other implementations.

In FIG. 4A, following the indication of the number of audio values 402-408, data specific to each of the included audio values 402-408 is provided. For each audio value 402-408, a sequence number of the audio value, the length of the audio value (e.g., n bytes), the actual audio value itself, and a possible verification byte for the audio value may be included. In the example packet 400, the verification byte may be a set value (e.g., 0xA5) indicating the end of the audio value. In other implementations, the verification byte may be a checksum or other error-detecting value based on the associated audio value, thus providing the receiver the ability to recalculate the verification byte and compare the calculated verification byte to the verification byte received in the packet 400 to determine whether the associated audio value has been corrupted.

After the last replicant audio value 408, the remainder of the digital audio data packet 400 may be padded with fill bytes (0x00), if necessary, for the length m of the packet 400 to be some specific value, such as 256 or 512 bytes. In some examples, the fill bytes may be positioned elsewhere within the packet 400, or may not be present in the packet 400.

In the specific example of FIG. 4A, and as depicted graphically in FIG. 4B, the first replicant value 404 is the seventh audio value preceding the current audio value 402, the second replicant value 406 is the thirteenth audio value preceding the current audio value 402, and the third replicant value 408 is the seventeenth audio value preceding the current audio value 402. Thus, for each succeeding packet 400, the audio values being transmitted are advanced by one value in time. As described above, each of the replicant audio values 404, 406, and 408 precede the current audio value 402 by some prime number of value positions. While the example packet 400 of FIG. 4A uses the prime numbers of 7, 13, and 17, other prime number combinations, such as, for example, 7, 13, and 17, may be utilized in other embodiments. Also, fewer or greater than three replicant audio values may be employed in other examples.

FIGS. 5 and 6 provide examples of two configuration files 500, 600 that may be stored in the audio converter device 300B of FIG. 3B, such as in the memory 308 incorporated therein. In one example, the configuration files 500, 600 may be loaded from an external computer or other communication device into the audio converter device 300B via the wired transceiver 312 or the WLAN transceiver 312A. Additionally, the configuration files 500, 600, after having been loaded into the converter device 300B, may be read and/or updated via one or more of the transceivers 312, 312A. In one example, an external computer or communication device may access the device by way of a web browser via an Internet Protocol (IP) address assigned to the converter device 300B.

More specifically, FIG. 5 is a depiction of an example setup file 500 that may be employed by the audio converter device 300B of FIG. 3B. In one implementation, the setup file 500 may be a standard text file named "setup.txt". The example setup file 500 may include an indication of the UDP port numbers to be used for transmitting the analog audio signal 320A (identified in the setup file 500 as "Channel A") and the analog audio signal 320B (denoted in the setup file 500 as "Channel B"). Thus, presuming use of the wired transceiver 312, the packets of the digital audio packet stream 321 associated with the analog audio signal 320A are directed to Port 8880, while the packets of the digital audio packet stream 321 associated with the analog signal 320B are directed to Port 8882.

FIG. 6 is a depiction of an example beacon file 600 that may also be stored in the converter device 300B of FIG. 3B. In this particular example, the beacon file 600 is an eXtensible Markup Language (XML) file named "beacon.xml". As depicted in FIG. 6, the example beacon file 600 may define several values that the converter device 300B is to transmit repeatedly at some time interval (e.g., once every five seconds) to the communication devices that may receive the digital audio packet stream 321, 322. These values may include, for example, an indication of the codec type (e.g., CELT), a version number of the software (e.g., 1.00), an identifier of the venue in which the converter device 300B is located (e.g., 2), a title or name of the venue (e.g., "Joe's Bar and Grill"), and an indication of the UDP or other communication ports and their corresponding audio streams (e.g., monaural audio from televisions A1 and B1 over Port 8880, and monaural audio from televisions C1 and D1 over Port 8882). Such information may be relayed to the potential receiving devices so that they may determine which audio streams to present to the user based on a user selection of the audio stream to be heard. The selection and ultimate presentation of an audio stream is discussed more fully below in conjunction with FIGS. 12, 13, 14A, and 14B. In other implementations, other types of information may be specified in the example beacon file 600 for periodic transmission to the potential receiving devices.

In one implementation, an additional file specifying an HTML webpage through which one or both of the configuration files 500, 600 may be read and/or updated via an external computer or communication device may be stored at the converter device 300B of FIG. 3B. For example, the file (e.g., "index.html") may provide an input field in which the current contents of one or both of the configuration files 500, 600 may be displayed, and in which changes to the configuration files 500, 600 be made. In one embodiment, the webpage may be presented to a user of an external computer or communication device in response to the IP address or other indicator identifying the converter device 300B being specified by the user in a web browser.

Figure 7:
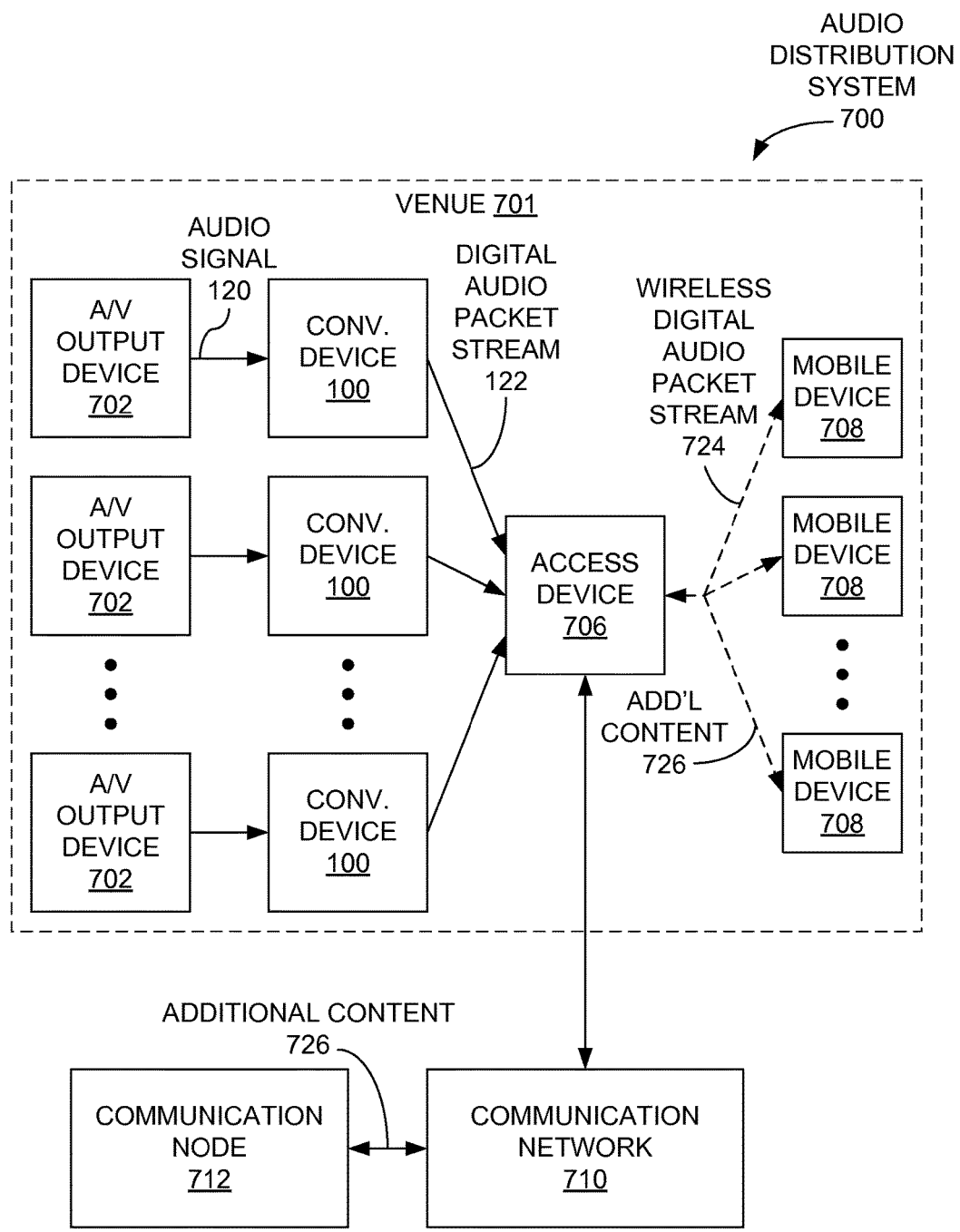
FIG. 7 is a block diagram illustrating an example audio distribution system including a plurality of audio converter devices and an access device.

FIG. 7 illustrates an audio distribution system 700 in which one or more audio converter devices 100 (FIG. 1) may be employed in one embodiment. Examples of the audio converter devices 100 may include the converter device 300A of FIG. 3A and the converter device 300B of FIG. 3B, described in detail above. Generally, the audio distribution system 700 is configured to provide multiple streams of audio content to at least one mobile device 708. In an example, the audio distribution system 700 may be located at a particular venue. In some implementations, the venue 701 may be a public venue, such as a restaurant, a drinking establishment, or a race and sports "book." In such a venue 701, each of multiple audio/video output devices 702, such as televisions, video monitors, video projectors, and the like, may present one of a number of sporting events or other audio/video programs to customers or viewers located at the venue 701. To allow the patrons of the venue 701 to hear the audio portion being received by one of the output devices 702, the audio distribution system 700 makes available the audio from the output devices 702 to one or more mobile communication devices 708 held or possessed by patrons of the establishment. Examples of the mobile communication devices 708 include, but are not limited to, cellular "smart" phones, personal digital assistants (PDAs), laptop computers, and tablet computers. In some implementations, each of the mobile communication devices 708 may be owned and operated by its respective user, or may be loaned or rented by operators of the venue 701 to the users.

In an example of the audio distribution system 700, each of the audio/video output devices 702 generating an audio signal that is desired to be distributed to users located at the venue 701 may be communicatively coupled with a converter device 100, which converts the audio signal from its corresponding output device 702 to a digital audio stream 122. Each converter device 100 may transmit its converted digital audio stream 122 to one or more access devices 706. The access device 706 distributes the received digital audio streams as one or more wireless digital audio streams 724 to the mobile communication devices 708. In one example, one or more of the converter devices 100 may be integrated with each other, with one or more A/V output devices 702, and/or with one or more of the access devices 706.

A user of each mobile communication device 708 may then select one of the digital audio streams 122 represented in the wireless digital audio stream 724 for reception and presentation at the mobile communication device 708 of the user. The user may then listen to the selected audio stream or channel, such as by way of a speaker incorporated into the mobile communication device 708, an earphone or headset connected to the mobile communication device 708, a Bluetooth®-enabled audio device communicatively coupled with the mobile communication device 708, or the like. As a result, each user possessing one of the mobile communication devices 708 may select and enjoy the audio portion of the audio/video content presented by way of one of the output devices 702.

In some examples, the audio distribution system 700 may also be employed as a communication conduit for offering one or more services associated with the venue 701, the audio/video content being presented via the output devices 702, or some other entity. These services may include, but are not limited to, chat rooms involving users of other mobile devices 708, advertising and sales associated with the venue 701 or other entities, customer loyalty programs associated with the venue 701 or another entity, social networking services involving other users of other mobile devices 708, and gaming or wagering services associated with the venue 701 or another entity. Such services may be organized and provided across the entire system 700, or according to some subdivision of the system 700, such as according to venue 701 or access device 706. In some examples, this functionality may be provided directly by the access device 706 or in conjunction with a communication node 712, such as an information server, communicatively coupled with the access device 706 by way of a communication network 710. Examples of the communication network 710 may include, but are not limited to, a wide-area network (WAN), such as an Intranet, the Internet, or some portion thereof, a local-area network (LAN), and an IEEE 802.11x (WiFi) network. Also, while the communication node 712 and the communication network 710 are shown as being located external to the venue 701, the communication node 712 and the network 710 may be located completely or partially within the venue 701 in other examples.

The converter device 100 may be configured to receive an analog audio signal 120 from one of the audio/video output devices 702. In one example, the analog audio signal 120 is carried by way of a wire, cable, optical fiber, or other wired means from a standard analog "audio out" connector of the corresponding output device 702 to the converter device 100. In another implementation, the analog out connector may be attached to a wireless transmitter to carry the analog audio stream as an analog or digital wireless signal to the converter device 100. Other methods and apparatus for carrying the audio signal 120 to the converter device 100 may be employed in other embodiments. In yet further examples, the audio signal 120 generated by the audio/video output device 702 may be digital in nature, in which case the converter device 100 may or may not be required in order to present a corresponding digital audio stream 122 to the access device 706. In some implementations, the converter device 100 may receive audio content from multiple audio/video output devices 702 simultaneously, as indicated above with respect to converter device 300B of FIG. 3B. Such multiple analog audio signals may be converted and then combined into a single digital audio stream 122 or multiple digital audio streams 122 for transmission to the access device 706. Further, the converter device 100 may physically reside remotely from, be attached externally to, or be located within the audio/video output device 702 to which the converter device 100 is communicatively coupled. More specifically, in one example, the converter device 100 may be integrated or reside within the audio/video output device 702, with the converter device 100 being electrically coupled to one or more portions of the circuitry within the audio/video output device 702, thus providing the converter device 100 access to those circuit portions that are not typically available via output ports or connections of the audio/video output device 702.

The digital audio packet stream 122 generated by the conversion module 100 may then be transmitted to the access device 706 as the digital audio packet stream 122. In one example, the digital audio packet stream 122 is transmitted over a wire, cable, optical fiber, or the like to the access device 706. In one example, the digital audio packet stream 122 is transmitted via an Ethernet connection or network to the access device 706. More specifically, the converter device 100 may be attached to an Ethernet network as a network appliance, along with other converter devices 100, for communicative coupling with the access device 706. In another implementation, the digital audio packet stream 122 is transmitted wirelessly, such as by way of a WiFi or Bluetooth® protocol.

Figure 8:
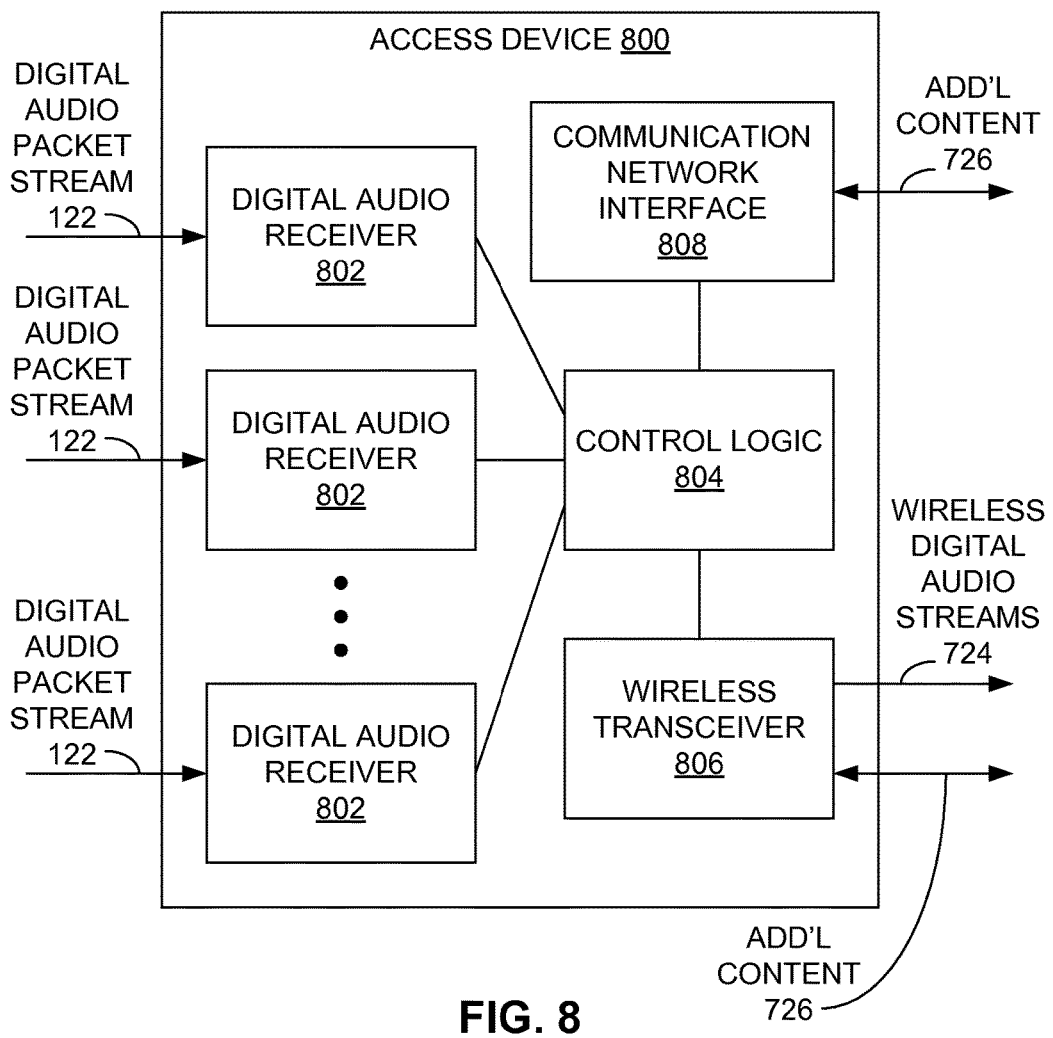
FIG. 8 is a block diagram illustrating an example access device implementable in the audio distribution system of FIG. 7.

FIG. 8 is a block diagram of an example access device 800 implementable as the access device 706 of FIG. 7. The example access device 800 may include one or more digital audio receivers 802, a wireless transceiver 806, a communication network interface 808, and control logic 804. In other examples, other components not explicitly shown in FIG. 8 may also be incorporated into the access device 800.

In the example of FIG. 8, each digital audio packet stream 122 generated by a converter device 100 may be received at a digital audio receiver 802 of the access device 800. In some implementations, such as the use of an Ethernet network to transmit and receive the digital audio streams 122, the digital audio receivers 802 may be embodied as a single Ethernet receiver or transceiver with multiple connectors, with each connector receiving a digital audio packet stream 122 from one of the converter devices 100. The Ethernet receiver may also act as a transceiver to provide the signals necessary to implement the Ethernet protocol, as controlled by the control logic 804. In other examples, a separate digital audio receiver 802 is used for each digital audio packet stream 122 to be received, as depicted in FIG. 8.

The control logic 804 may provide each of the received digital audio streams 122 to the wireless transceiver 806 for transmission as one or more wireless digital audio streams 724 to the mobile communication devices 708 of FIG. 7. In one example, the wireless transceiver 806, in conjunction with the control logic 804, operates as a transceiver operating under IEEE 802.11x (WiFi) protocols. In addition, the access device 800 may serve as a wireless router for transfer of additional content 726 between the various mobile communication devices 708. The access device 800 may, in some examples, operate as a router for transfer of information associated with the converter devices 100, including configuration information.

The communication network interface 808 is configured to facilitate communications between the access device 800 and the communication node 712 of FIG. 7 via the communication network 710. In one example, the communication network interface 808 employs an Ethernet connection for communication with a gateway device, such as a cable or digital subscriber line (DSL) modem in communication with the Internet or other communication network 710. In another example, the communication network interface 708 may incorporate the functionality of such a gateway device.

In some implementations, the control logic 804 may provide functionality, possibly under the guidance of a system administrator or other personnel, to support a number of functions related to the operation of the audio distribution system 700. These functions may include, but are not limited to, configuration and operation of the audio distribution functions, network management and administration of the mobile communication devices 708 as nodes of a LAN, and network routing functions for the LAN. The control logic 804 may also provide web-related functions, such as a captive portal and redirection functions similar to those associated with a "walled garden," thus giving the proprietor of the venue 701 or other entity control over web content accessible by the mobile communication devices 708 via the access device 800. Such a walled garden may, for example, exhibit control over which Web-based applications, media, and content are available via the access device 800, such as by way of Uniform Resource Locator (URL) filtering or other means of restricting access to various portions of the Internet. Further, in one example, the control logic 804 prevents mobile communication devices 708 that are not executing a specific application that may be required to communicate with the access device 800 from discovering a network access password needed to engage in communications with the access device 800.

The control logic 804, possibly in conjunction with the communication node 712 of FIG. 7, may also facilitate one or more of the services described above, such as chatting, gaming, point-of-sale transactions, customer loyalty programs, and the like. The control logic 804 may include electronic hardware, software, or some combination thereof, such as one or processors configured to execute instructions that cause the processor to perform the various operations described herein that are attributed to the access device 800.

Figure 9:
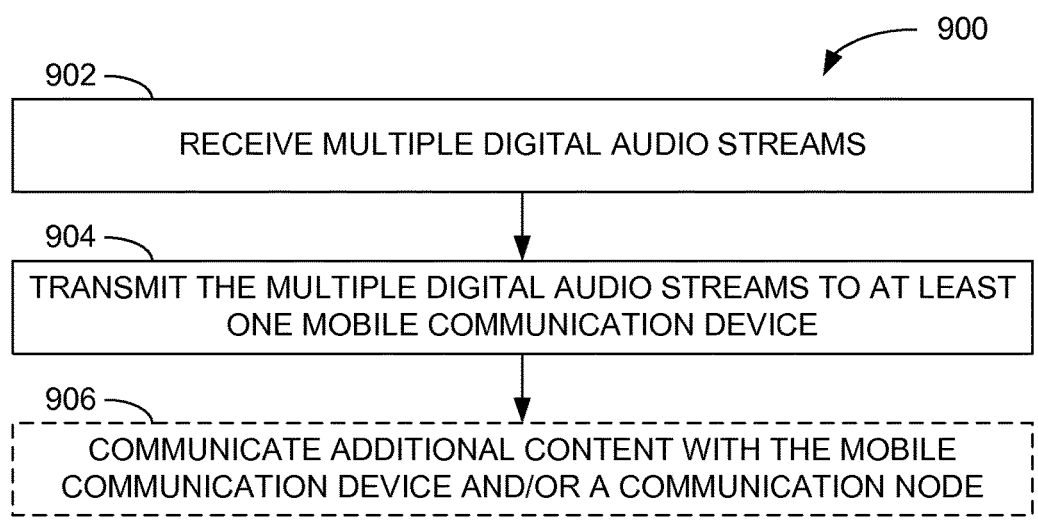
FIG. 9 is a flow diagram illustrating an example method of operating the example access device of FIG. 8.

FIG. 9 illustrates an example method 900 of operating the access device 800 of FIG. 8. In the method 900, the access device 800 receives multiple digital audio streams (operation 902), possibly from one or more converter devices, such as the converter device 100 of FIG. 7 or the converter devices 300A, 300B of FIGS. 3A and 3B, respectively. The access device 800 transmits the multiple digital audio streams as one or more wireless digital audio streams to at least one mobile communication device (operation 904). The access device 800 may also communicate additional content with the at least one mobile communication device and/or a communication node (operation 906), as noted above.

Figure 10:
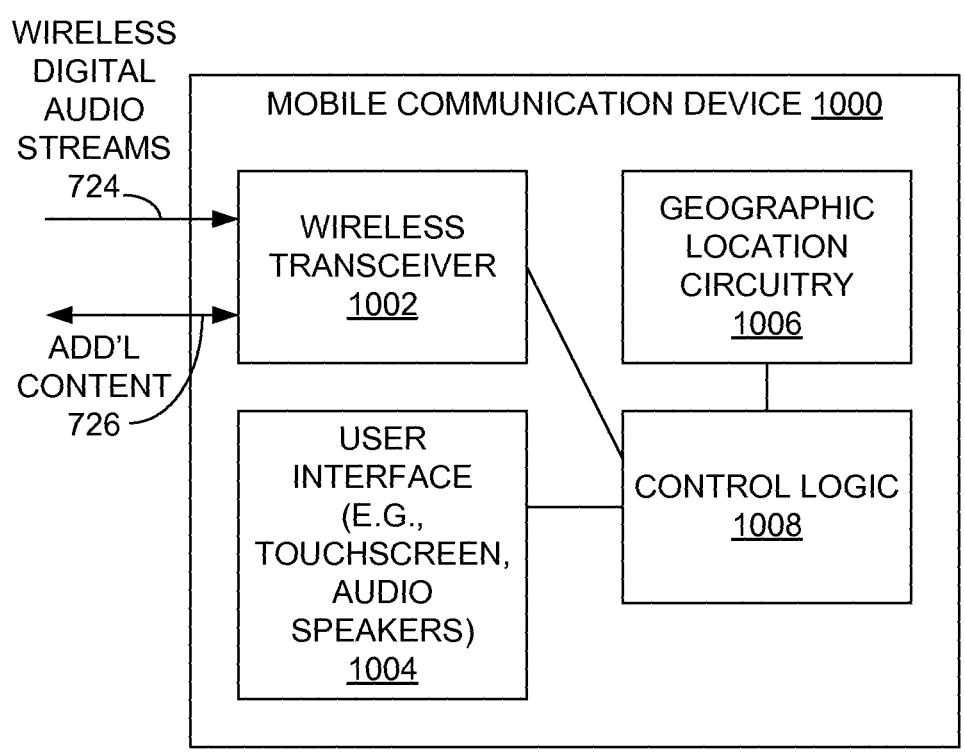
FIG. 10 is a block diagram illustrating an example mobile communication device implementable in the audio distribution system of FIG. 7.

FIG. 10 is a block diagram illustrating an example mobile communication device 1000 implementable as one or more of the mobile communication devices 708 of FIG. 7. Examples of the mobile communication device 1000 include, but are not limited to, "smart" phones, PDAs, laptop computers, and tablet computers. The mobile communication device 1000 includes a wireless transceiver 1002, a user interface 1004, geographic location circuitry 1006, and control logic 1008. Other components not explicitly depicted in FIG. 10 may be incorporated into the mobile communication device 1000 in other embodiments.

The wireless transceiver 1002 receives the one or more wireless digital audio streams 724 transmitted from an access device 706, as well as transmits and/or receives the additional content 726 mentioned above. In one example, the wireless transceiver 1002, under the operation of the control logic 1008, communicates with the access device 706 using WiFi protocols. In some examples, the wireless transceiver 1002 may also communicate with another communication network, such as a cellular telephone network employing CDMA (Code Division Multiple Access), GSM (Global System for Mobil Communications), and/or other communication protocols.

In one embodiment, the wireless transceiver 1002 may receive the one or more wireless digital audio streams 724 from a source other than the access device 706. For example, a centralized audio stream server (which may not be associated with, or located near, the venue 701 at which the mobile communication device 1000 is positioned) may provide at least some digital audio streams by way of the Internet or another communication network to the mobile communication device 1000. Use of a centralized audio stream server may be appropriate in situations in which, for example, converter devices 100 are not available at the venue 701.

The user interface 1004 allows a user of the mobile communication device 1000 to interact with the mobile communication device 1000. Such interaction may include, for example, user selection of a wireless digital audio stream 724 received at the mobile communication device 1000, user listening of the selected wireless digital audio stream 724, and user involvement with services provided via the access device 706 by way of the additional content 726 communicated between the mobile communication device 1000 and the access device 706. Components that may be incorporated as part of the user interface 1004 may include, but are not limited to, a visual display (possibly integrated with a touch display or touchscreen), a keypad, an audio speaker and/or audio connector, a Bluetooth® interface for an audio speaker or earphone, a microphone, a camera, and an accelerometer.

The mobile communication device 1000 may also include the geographic location circuitry 1006, an example of which may be circuitry for receiving satellite signals from the Global Positioning System (GPS) that may be employed by the control logic 1008 to determine the geographic location of the mobile communication device 1000. The control logic 608 may also employ the location information to determine if a nearby access device 706 is available to the mobile device 1000 for communication purposes.

The control logic 1008 may control any and/or all of the other components of the mobile communications device 1000, such as the wireless transceiver 1002, the user interface 1004, and the geographic location circuitry 1006. The control logic 1008 may include electronic hardware, software, or some combination thereof, such as one or more processors configured to execute instructions that cause the processor to perform the various operations described herein that are attributed to the mobile communication device 1000.

Figure 11:
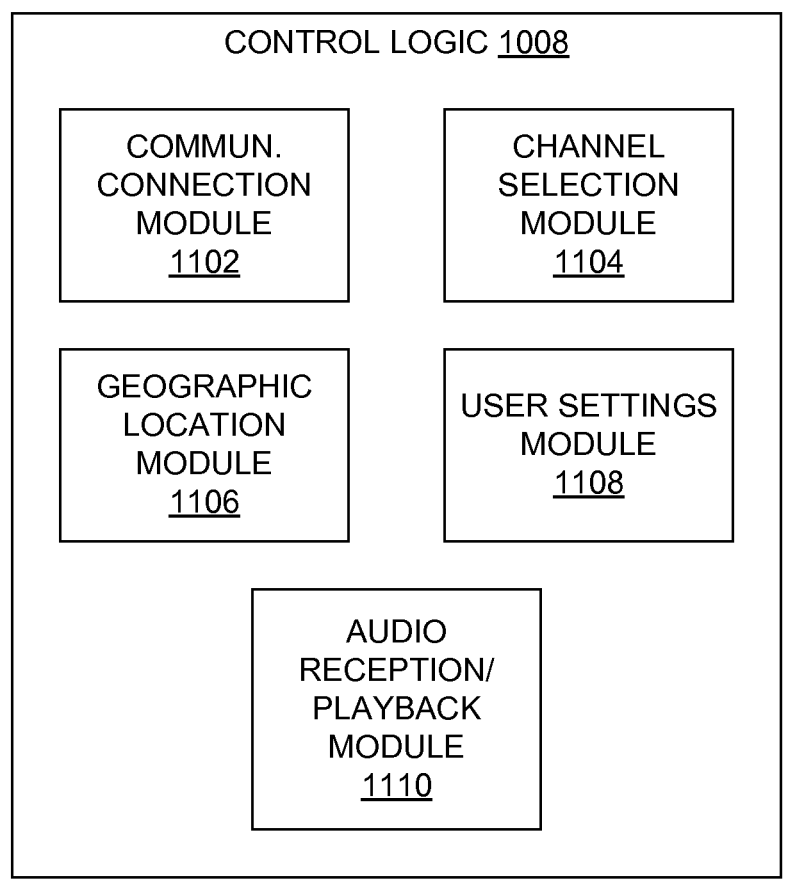
FIG. 11 is a block diagram illustrating example modules implementable as control logic for the example mobile communication device of FIG. 10.

FIG. 11 is a block diagram of example modules incorporated as part of the control logic 1008 of the mobile communications device 1000 of FIG. 10. Each of the modules shown in FIG. 11 may include hardware, software, or some combination thereof. The example modules may include a communication connection module 1102, a channel selection module 1104, a geographic location module 1106, a user settings module 1108, and an audio reception/playback module 1110. Other modules not explicitly depicted in FIG. 11, such as those for supplying a chat service, an advertising/sales service, a gaming service, a customer loyalty service, and a social network access service, may also being included in the control logic 1008. In one example, one or more of the modules 1102-1110 may be included or represented in an application, or "app," that may be loaded into, and executed by, the control logic 1008 to provide the various functions described in greater detail below by the mobile communication device 1000.

In one example, the communication connection module 1102 facilitates the creation of a communication connection between the mobile communication device 1000 and the access device 706 to allow the reception of the one or more wireless digital audio streams 724, as well as the transmission and reception of the additional content 726. The communication connection module 1102 may also assist in creating a secure connection between the mobile communication device 1000 and the access device 706 for various services mentioned above. In one example, the communication connection module 1102 also facilitates creating a communication connection between the mobile communication device 1000 and the communication node 712 of FIG.

1 and other nodes by way of an alternative communication network, such as a cellular telephone network.

The channel selection module 1104, in one example, presents identities of a set of audio channels to the user via the user interface 1004 as carried in the one or more wireless digital audio streams 724, receives a user selection of one of the channels, and presents the selected channel to the user, such as by way of an audio speaker or other audio output interface. In an example, the channel selection module 1104 may present the identity of an audio channel associated with an identity of its corresponding audio/video output device 702 so that the user may discern which audio channel to select for the video content he is currently viewing.

In one example, the geographic location module 1106, by utilizing the geographic location circuitry 1006, may determine the current location of the mobile communication device 1000 to decide which of multiple access devices 706 currently available are providing acceptable communication signals or signal strengths to the mobile communication device 1000, and thus are the access devices 706 most likely to provide audio content of interest to the user of the mobile communication device 1000.

In another example, the current location of the mobile communication device 1000 may be used to recommend other locations or venues that possess at least one access device 706 for the provision of the services described herein, especially in cases in which no access devices 706 are immediately available at the current location.

In other situations, technologies other than the geographical location circuitry 1006 may be utilized to determine with greater specificity a location of the mobile communication device 1000. In just one example, the geographic location module 1106 may be configured to decipher quick response (QR) codes placed at various locations in a venue 701 to determine the location of the mobile communication device 1000 within the venue 701. Such information may then be made available to the communication node 712 to refine or otherwise direct the services provided to the mobile communication device 1000, such as the delivery of food to a specific table equipped with the QR code. Other technologies, such as radio-frequency identification (RFID) technology, may be used to similar effect.

The user settings module 1108 may allow a user to alter or change various settings or parameters that control the operation of the mobile communication device 1000 or the access device 706. Examples of such settings include, but are not limited to, details regarding how the mobile communication device 1000 presents information to the user, information associated with the user (such as a chat "handle" or identifier for the user), selection of a LAN for communication with an access device 706, user visibility/anonymity settings, and user preferences regarding reception of personalized offers or loyalty program subscriptions.

The audio reception/playback module 1110 may facilitate the reception and subsequent playback to the user of a selected one of the digital audio packet streams 122 incorporated in the wireless digital audio packet stream 724 received at the mobile device 708. Operation of the audio reception/playback module 1110 is described more fully below in connection with FIGS. 14A and 14B.

Figure 12:
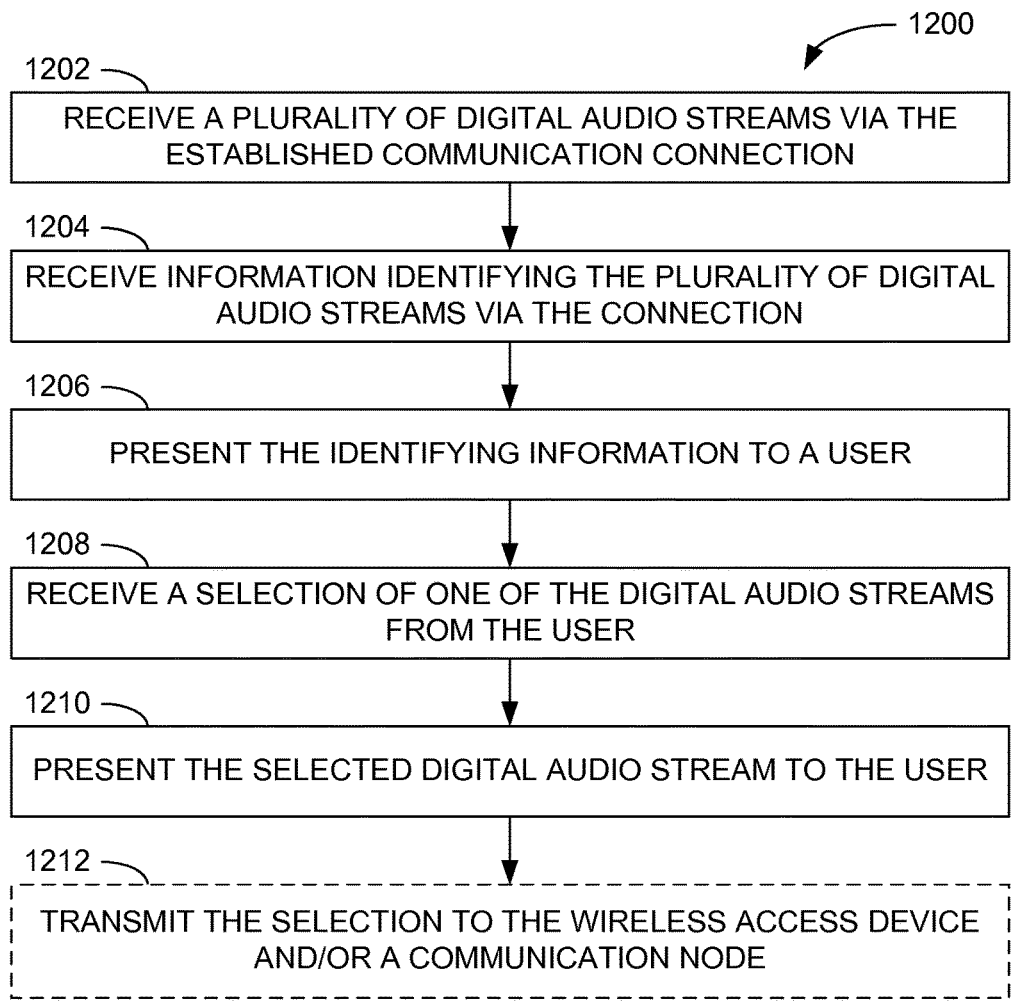
FIG. 12 is a flow diagram illustrating an example method of operating the example mobile communication device of FIG. 10 to provide a selected digital audio stream to a user.

FIG. 12 is a flow diagram of an example method 1200 of receiving audio data into the mobile communication device 1000 after a communication connection with the access device 706 has been established. In the method 1200, the mobile communication device 1000 receives a plurality of digital audio streams via the established communication connection (operation 1202). Each of the streams may represent the audio content from a particular audio/video output device 100 in one implementation. In one example, the plurality of digital audio streams may be combined into fewer signal data streams, wherein the digital audio streams are multiplexed in some fashion. The mobile communication device 1000 also receives information identifying the plurality of digital audio streams via the communication connection (operation 1204). Within each converter device 100, the identifying information associated with that converter device 100 may be stored in its corresponding beacon file 600 (described above) and transmitted periodically via the access device 706 to the mobile communication device 1000. The mobile communication device 1000 may then combine the identifying information received from each of the converter devices 100 before presentation to the user. The identifying information may also include, in one implementation, an identification of the audio/video output device 102 that is sourcing the audio of each digital audio stream.

After the mobile communication device 1000 presents the identifying information to the user (operation 1206), the mobile communication device 1000 receives a selection of one of the digital audio streams from the user (operation 1208). In response to the user selection, the mobile communication device 1000 presents the selected digital audio stream to the user for listening (operation 1210). In some implementations, the mobile communication device 1000 may also transmit the user selection to the wireless access device 706 and/or the communication node 712 (operation 1212), as the identification may allow presentation of additional content 726 (such as product or service advertising) that is related to the audio/video content being consumed by the user.

Figure 13:
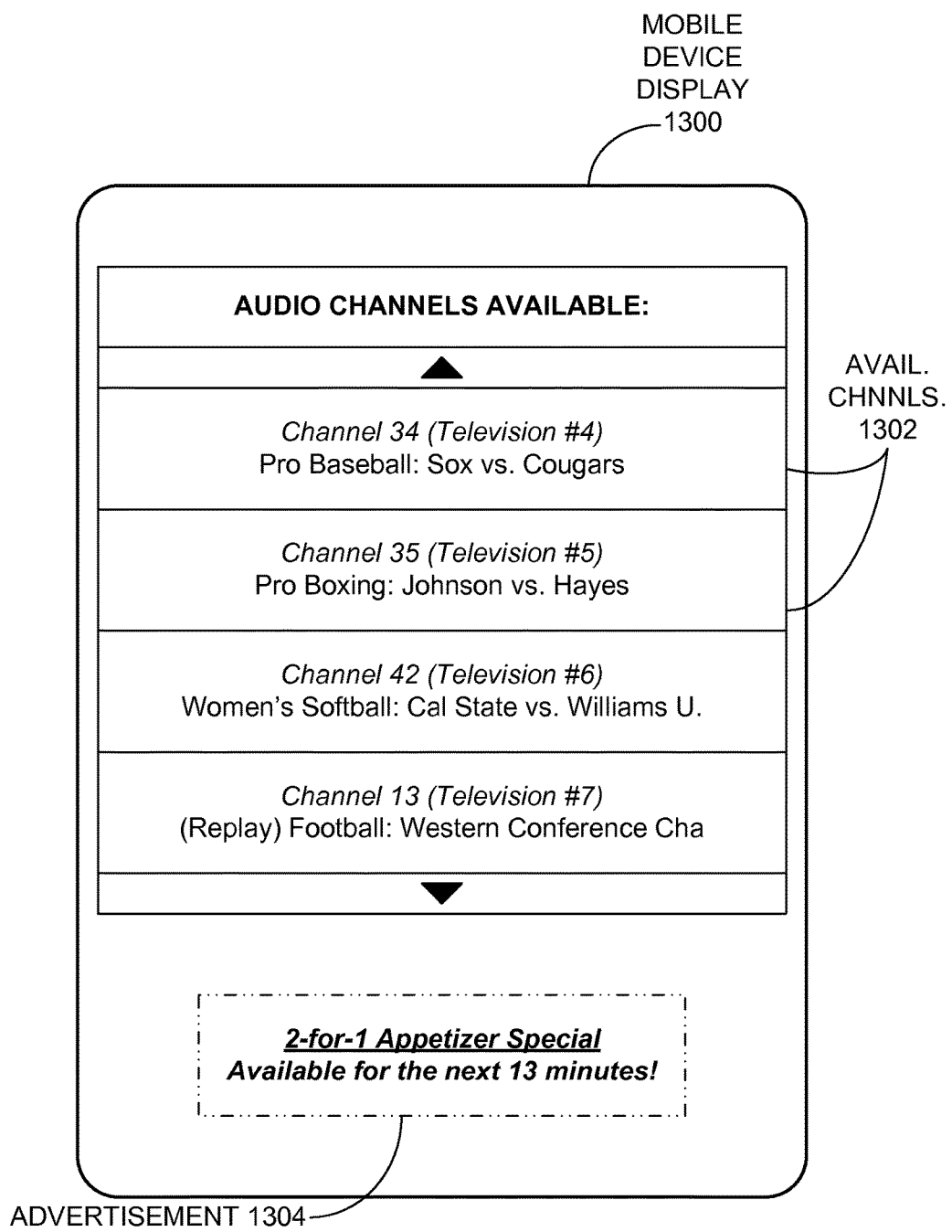
FIG. 13 is a graphical representation of example information provided on a display of an example mobile communication device.

FIG. 13 is a graphical representation of an example mobile device display 1300 of the mobile communication device 1000 presenting the identity of several digital audio data streams available for reception. More specifically, the display 1300 presents the identity of several different audio/video channels 1302 along with an identity of the particular audio/video output device 702 associated with the digital audio stream and a short description of the audio/video content. In one example, presuming the display 1300 is a touchscreen, the user need only touch a representation of one of the available audio channels 1302, and the mobile communication device 1000 begins presenting the audio for the selected channel in response. Also shown in the display 1300 may be an advertisement 1304 presented by the establishment or venue 701 in which the mobile communication device 1000 is located. Given the potential real-time nature of the information being presented to the user, the advertisement 1304 may incorporate a time-critical element, such as an expiration time.

In one example, upon the user selecting one of the available audio channels 1302, a second display associated with the selected audio channel may be presented to the user. This display may present information, such as the broadcast channel and the particular program or event involved, which is specifically associated with the selected audio channel. In some examples, the channel-specific display may include advertising, such as advertising corresponding to the broadcast channel or the venue.

Figure 14A:
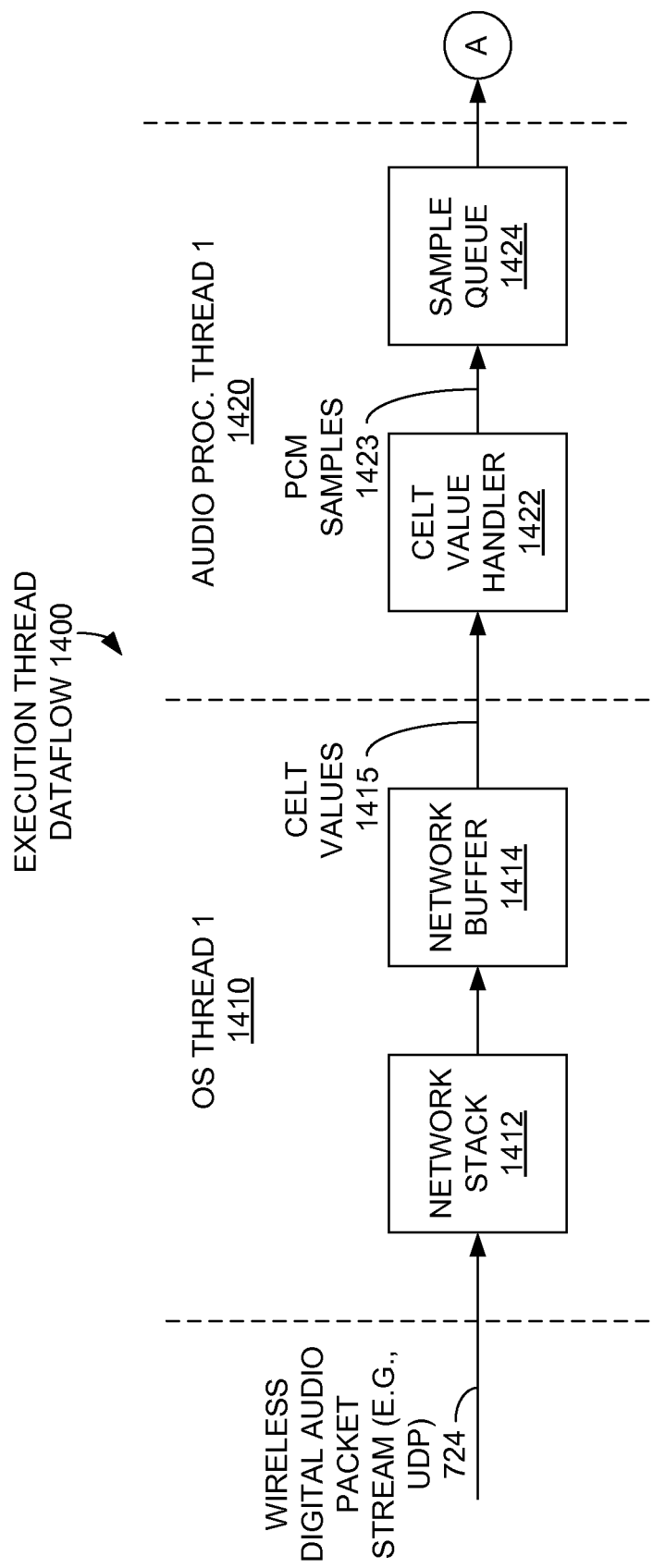
FIGS. 14A and 14B present a flow diagram illustrating operations of various execution threads executing within the example mobile communication device of FIG. 10 for processing a received digital audio packet stream.
Figure 14B:
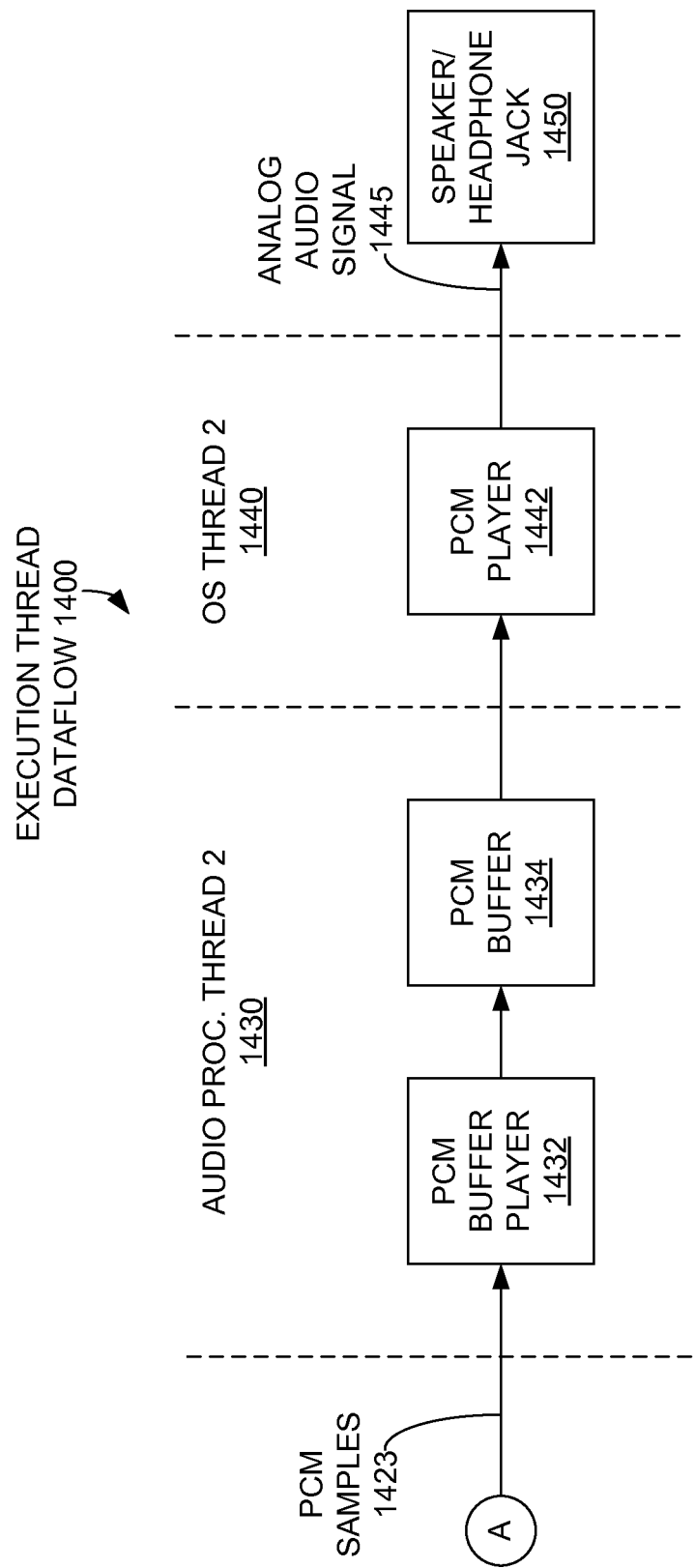

FIGS. 14A and 14B present a flow diagram illustrating operations of various execution threads executing within the example mobile communication device 1000 of FIG. 10 for processing a received digital audio packet stream according to an example execution thread dataflow 1400. In the particular example of FIGS. 14A and 14B, the wireless digital audio packet stream 724 received from the access device 706 of FIG. 7 may be processed using four separate execution threads operating within the mobile communication device 1000: a first OS (Operating System) thread 1410, a first audio processing thread 1420, a second audio processing thread 1430, and a second OS thread 1440. However, any number of execution threads may be employed for the processing and presentation of audio data to a user of the mobile communication device 1000 in other embodiments. In this example, the operating system of the mobile communication device 1000 is a version of the Android® operating system, but other types of operating systems, such as iOS by Apple, Inc., may be employed in other examples.

In FIG. 14A, the first OS thread 1410 may implement a network stack 1412 and a corresponding network buffer 1414. The network stack 1412 may receive the packets of the wireless digital audio packet stream 724 (e.g., a UDP digital audio packet stream), and place the received packets in the network buffer 1414. In some examples, the network stack 1412 may receive all network traffic, which may include other data in addition to the wireless digital audio packet stream 724 and place that traffic in the network buffer 1414. In one instance, the operation of the network stack 1412 and the network buffer 1414 may introduce a latency about 100 msec from the time the UDP packet arrives at the network stack 1412 and the resulting CELT values from the packets are available at the first audio processing thread 1420.

In the first audio processing thread 1420, a CELT value handler 1422 may retrieve at least some of the UDP packets that were stored in the network buffer 1414 from the wireless digital audio packet stream 724, extracts at least some of the CELT values 1415 stored in the packets, reconstructs the PCM samples 1423 from the extracted CELT values 1415, and stores the reconstructed PCM samples 1423 in a sample queue 1424. In one example, the PCM samples 1423 are generated according to the 48 kbps, 16-bit signed format mentioned above.

In one example, the CELT value handler 1422 may also employ an internal buffer (not explicitly shown in FIG. 14A) in which the CELT value handler 1422 stores the CELT values 1415 in order according to the sequence number of each CELT value 1415. Further, the CELT value handler 1422 may use any of the current CELT values or replicant CELT values from the packets of the wireless digital audio packet stream 724 to reconstruct the original stream of CELT values generated in the converter device 100, 300A, 300B. Using the digital audio data packet 400 of FIG. 4A as a specific example, if a packet containing a current CELT value 402 with a sequence number of x is not received due to a communication collision or other problem, but those current CELT values 402 with sequence numbers x+1, x+2, and x+3 have been received at the CELT value handler 1422, the current CELT value handler 1422 may thereafter receive the CELT value 402 as a first replicant value 404, a second replicant value 406, or a third replicant value 408 in a subsequent digital audio data packet 400, as described above.

Given the preceding operations, the length of this internal buffer may be designed in one embodiment to receive the oldest replicant packets while still retaining the capacity to store each current CELT value 1415 that is being received at the CELT value handler 1422. In one example, presuming a fundamental time frame of 10 msec for each CELT value 1415 and an oldest replicant CELT value lagging the current CELT value by seventeen values (e.g., the third replicant value 408 of FIG. 4A), the internal buffer may be at least large enough to store eighteen CELT values, corresponding to approximately 180 msec. In some examples, the capacity of the internal buffer may be extended (e.g., 200 msec total) to account for possible delaying of UDP packets in the wireless digital audio packet stream 724, such as by buffering of the packets in the access device 706 of FIG. 7. Thus, the first audio processing thread 1420 may introduce an additional latency of approximately 200 msec.

In addition, the CELT value handler may also perform an error detection operation on each received CELT value 1415, such as by way of the verification byte of each current and replicant CELT value 402-408 to determine if the received CELT value 1415 should be stored, or else discarded in favor of a replicant CELT value 404-408 yet to be received at the mobile communication device 1000.

In one example, instead of using an internal buffer for the received CELT values, the CELT value handler 1422 may use the sample queue 1424 to monitor which CELT values and associated PCM samples have been received, to determine which values or PCM samples still need to be received by way of replicant CELT values, and to perform other operations provided by the CELT value handler 1422.

As illustrated in FIG. 14B, the second OS thread 1440 includes a PCM player 1442 which receives the PCM samples 1423, converts the samples 1423 to an analog audio signal 1445 using a digital-to-analog converter (ADC), and forwards the analog audio signal 1445 to a speaker/headphone jack 1450 for presentation to the user. In an embodiment, the PCM player 1442 is directly compatible with the PCM samples 1423 produced by the CELT value handler 1422, which may be in a 48-kbps, 16-bit signed stereo format, as described above. However, in one example, the PCM player 1442 may not be configured to extract the PCM samples 1423 at a consistent rate. More specifically, the PCM player 1442 may at times extract many PCM samples 1423 at once, and then subsequently allow many milliseconds to pass before extracting more of the PCM samples 1423.

To protect against potential buffer overruns or underruns involving the PCM player 1442, the second audio processing thread 1430 may incorporate a PCM buffer player 1432 and an associated PCM buffer 1434. While the sample queue 1424 of the first audio processing thread 1420 makes available a set of PCM samples 1423 once every 10 msec in accordance with the fundamental time period of the CELT decoding process with some regularity, the PCM buffer player 1432 may at least partially fill the subsequent PCM buffer 1434 by some predetermined amount or percentage with the PCM samples 1423 from the sample queue 1424 before initiating the PCM player 1442 to begin retrieving the PCM samples 1423 from the PCM buffer 1434 for generation of the analog audio signal 1445. In one implementation, the PCM buffer player 1432 fills the PCM buffer 1434 at least halfway prior to initiating the PCM player 1442. In one example, the operation of the second audio processing thread 1430 and the second OS thread 1440 may incur approximately an additional 200 msec of latency.

Thus, based on the foregoing discussion, the execution thread dataflow 1400 may, in some implementations, introduce a latency of approximately 500 msec. Given a presumed additional latency of 20 to 40 msec due to other portions of the communication path from one of the audio/video output devices 702, through the converter device 100 and the access device 706, as shown in FIG. 7, a user may experience a total latency of 520 to 540 msec between the video presented by the audio/video output device 702 and the audio being output by the mobile communication device 100. Such latency is generally less than what is likely to be experienced by use of a more conventional encoding scheme, such as MP3, while at the same time providing redundancy in the transmission of digital audio data in a wireless environment.

While much of the above discussion focuses on certain public venues, such as restaurants, bars, and sports books, as likely locations for implementation of the systems and methods described herein, other venues, both public and private, such as airport terminals or gate areas, corporate reception lobbies, doctor's office waiting areas, classrooms, and so on, may also benefit from application of the various concepts described herein.

Modules, Components, and Logic

Certain embodiments, such as the converter devices 100, 300A, 300B, the access devices 706, 800, the mobile communication devices 708, 1000, and the communication node 712 discussed above, are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 15:
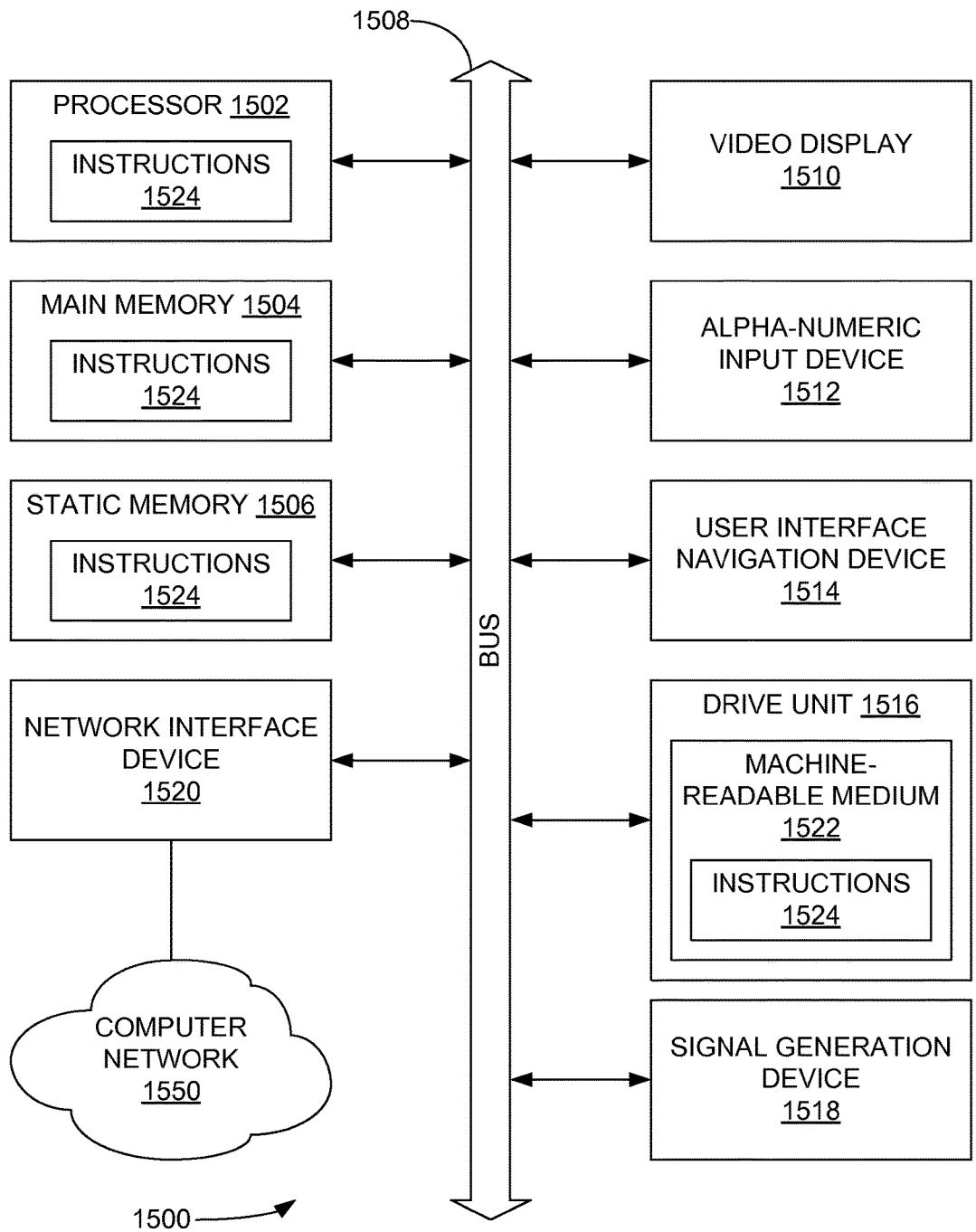
FIG. 15 is a diagrammatic representation of a machine in the example form of a computer system within which a set of instructions for causing the machine to perform any one or more of the methodologies discussed herein may be executed.

FIG. 15 is a block diagram of a machine in the example form of a computer system 1500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 1524 may further be transmitted or received over a computer network 1550 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, methods and systems to transmit one or more streams of audio data in a redundant and low-latency manner have been described. Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive "or", such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A digital audio converter device for redundant, low-latency transmission of one or more digital audio streams, the converter device comprising:
   a receiver to receive an audio signal;
   a digital audio encoder to encode the audio signal into a stream of digital audio values forming a sequence of digital audio values, each digital audio value having an audio-value position, the audio-value position indicating a position of the digital audio value in the sequence;
   a digital audio packetizer to generate a stream of digital audio data packets from the stream of digital audio values, each of the digital audio data packets including a current digital audio value and a plurality of previous digital audio values of the stream of digital audio values where, for each of the digital audio data packets, each of the plurality of previous digital audio values precede the current digital audio value in the sequence of digital audio values by a respective prime number of audio-value positions such that in each of the digital audio data packets the plurality of previous digital audio values each have a different audio-value position for interference resistance to a periodic noise or communication source; and
   a transmitter to transmit the stream of digital audio data packets to a receiving device.

2. The converter device of claim 1, the audio signal comprising an analog audio signal, and the receiver comprising an analog-to-digital converter to digitize the analog audio signal.

3. The converter device of claim 1, wherein each of the digital audio data packets includes a current digital audio value and a plurality of previous digital audio values.

4. The converter device of claim 3, the plurality of previous digital audio values comprising a first previous digital audio value preceding the current digital audio value by seven audio-value positions in the sequence of digital audio values, a second previous digital audio value preceding the current digital audio value by thirteen audio-value positions in the sequence of digital audio values, and a third previous digital audio value preceding the current digital audio value by seventeen audio-value positions in the sequence of digital audio values.

5. The converter device of claim 3, the plurality of previous digital audio values comprising a first previous digital audio value preceding the current digital audio value by seven audio-value positions in the sequence of digital audio values, a second previous digital audio value preceding the current digital audio value by eleven audio-value positions in the sequence of digital audio values, and a third previous digital audio value preceding the current digital audio value by seventeen audio-value positions in the sequence of digital audio values.

6. The converter device of claim 1, the stream of digital audio packets comprising user datagram protocol packets.

7. The converter device of claim 1, the digital audio encoder to encode the audio signal according to a constrained energy lapped transform.

8. The converter device of claim 1, each of the digital audio data packets including a sequence number identifying each of the digital audio values included in the corresponding digital audio data packet.

9. The converter device of claim 1, each of the digital audio data packets including a verification byte for each of the digital audio values included in the corresponding digital audio data packet, the verification byte including additional information verifying accuracy of the digital audio value associated with the verification byte.

10. The converter device of claim 9, the verification byte comprising a checksum based on the digital audio value associated with the verification byte.

11. The converter device of claim 1, further comprising a memory device including a beacon file comprising information associated with the converter device, the transmitter to transmit the information repetitively to the receiving device.

12. The converter device of claim 11, the information comprising an identification of a communication port of the receiving device to which the stream of digital audio data packets is to be transmitted.

13. The converter device of claim 11, the information comprising an identification of a venue at which the converter device is located.

14. A method for redundant, low-latency transmission of one or more digital audio streams, the converter device, the method comprising:
receiving an analog audio signal;
digitizing the analog audio signal into a stream of digital audio samples;
encoding the digital audio samples into a stream of digital audio values forming a sequence of digital audio values, each digital audio value having an audio-value position, the audio-value position indicating a position of the digital audio value in the sequence;
generating, using at least one processor of a machine, a stream of digital audio data packets from the stream of digital audio values, each of the digital audio data packets including a current digital audio value and a plurality previous digital audio values of the stream of digital audio values where, for each of the digital audio data packets, each of the plurality of previous digital audio values precede the current digital audio value in the sequence of digital audio values by a respective prime number of digital-audio positions, such that in each of the digital audio data packets the plurality of previous digital audio values each have a different audio-value position for interference resistance to a periodic noise or communication source; and
transmitting the stream of digital audio data packets to a receiving device.

15. A non-transitory computer-readable medium comprising instructions for receiving redundant low-latency transmission of one or more digital audio streams, the instructions, when executed on at least one processor of a mobile communication device, cause the mobile communication device to:
receive a plurality of encoded audio values comprising multiple copies of each of a sequence of encoded audio values representing an audio signal, each of the sequential encoded audio values having an audio-value position, the audio-value position indicating a position of the encoded audio value in the sequence, and at least one of the multiple copies of an encoded audio value is received in a data packet that includes a plurality of encoded audio values in the sequence, the plurality of encoded audio values including a current encoded audio value and a plurality of previous encoded audio values each having an audio-value position that precedes the current encoded audio value in the sequence by a respective prime number of audio-value positions, such that each of the plurality of previous encoded audio values have a different audio-value position for interference resistance to a periodic noise or communication source;
store one of the multiple copies of each of the sequence of encoded audio values in a first buffer;
decode each stored copy of each of the sequence of encoded audio values to generate a stream of digital audio samples;
store each of the stream of digital audio samples in a queue; and
forward the stream of digital audio samples from the queue for presentation to a user of the mobile communication device.

16. The non-transitory computer-readable medium of claim 15, the instructions causing the mobile communication device to receive the plurality of encoded audio values from a network buffer of an operating system of the mobile communication device.

17. The non-transitory computer-readable medium of claim 15, the instructions causing the mobile communication device to store the digital audio samples of the stream of digital audio samples in a second buffer, the mobile communication device to fill the second buffer by some predetermined amount prior to forwarding the stream of digital audio samples.

18. The non-transitory computer-readable medium of claim 17, the instructions causing the mobile communication device to forward the stream of digital audio samples by initiating an audio player of an operating system of the mobile communication device.

19. The non-transitory computer-readable medium of claim 17, the instructions causing the mobile communication device to store the digital audio samples of the stream of digital audio samples in the second buffer in a separate execution thread from the storing of the stream of digital audio samples in the queue.

20. The non-transitory computer-readable medium of claim 15, wherein the another encoded value in the sequence has an audio-value position that precedes the encoded audio value in the sequence by seven audio-value positions, such that the sequence includes six encoded audio values between the encoded audio value and the another encoded audio value and the data packet includes a copy of the encoded audio value and the another encoded audio value.

21. A method for redundant low-latency transmission of one or more digital audio streams, the method comprising:
receiving an analog audio signal;
digitizing the analog audio signal into a stream of digital audio samples;
encoding the digital audio samples into a stream of digital audio values forming a sequence of digital audio values, each digital audio value having an audio-value position, the audio-value position indicating a position of the digital audio value in the sequence; and
providing multiple copies of each of a plurality of the digital audio values to a receiving device by transmitting a stream of digital audio data packets, the digital audio data packets generated, using at least one processor of a machine, from the stream of digital audio values, each of the digital audio data packets including a current digital audio value and a plurality of previous digital audio values of the stream of digital audio values where, for each of the digital audio data packets, each of the plurality of previous digital audio values precede the current digital audio value in the sequence of digital audio values by a respective prime number of digital-audio positions such that in each of the digital audio data packets the plurality of previous digital audio values each have a different audio-value position for interference resistance to a periodic noise or communication source.

22. The method of claim 21, wherein the respective number of digital-audio positions is selected from a non-repeating sequence of numbers.

* * * * *